United States Patent [19]
Fortune et al.

[11] Patent Number: 5,315,218
[45] Date of Patent: May 24, 1994

[54] MOTOR CONTROLS

[75] Inventors: Glenn C. Fortune, Farmington Hills; William L. Kelledes, Brighton, both of Mich.

[73] Assignee: Eaton Corporation, Cleveland, Ohio

[21] Appl. No.: 27,836

[22] Filed: Mar. 8, 1993

[51] Int. Cl.$^5$ .............................................. H02P 5/46
[52] U.S. Cl. ........................................ 318/54; 318/65; 318/112; 74/336 R
[58] Field of Search ................. 318/35, 37, 49, 51, 318/53-54, 59, 65, 101, 102, 111-113; 74/471 XY, 473 R, 477, 335, 336 R, 337, 365, 866

[56] References Cited

U.S. PATENT DOCUMENTS

| | | | |
|---|---|---|---|
| 4,296,361 | 10/1981 | Archer | 318/54 |
| 4,405,887 | 9/1983 | Tamura et al. | 318/54 Y X |
| 4,651,855 | 3/1987 | Grunberg | 192/0.032 |
| 4,670,693 | 6/1987 | Kazami et al. | 318/54 X |
| 4,857,813 | 8/1989 | Matsumoto et al. | 318/54 |
| 4,873,881 | 10/1989 | Edelen et al. | 74/336 R |
| 5,063,511 | 11/1991 | Mack et al. | 364/424.1 |

Primary Examiner—William M. Shoop, Jr.
Assistant Examiner—David Martin
Attorney, Agent, or Firm—Tarolli, Sundheim & Covell

[57] ABSTRACT

An electrically actuated shifting mechanism includes a reversible rail select electric motor and a reversible in-gear electric motor. Three groups of switches are provided to effect one-at-a-time operation of the motors with a center group of switches being used to effect operation of either the rail select or the in-gear motor and to determine the direction of operation of the motor. In one embodiment of the invention, the motor control circuitry also controls the operation of a main clutch motor. Four groups of switches are used to effect operation of the in-gear, rail select and clutch motors in desired directions. Pulse width modulation is used to effect simultaneous and out-of-phase operation of the in-gear and main clutch motors.

8 Claims, 4 Drawing Sheets

MOTOR CONTROLS

BACKGROUND OF THE INVENTION

This invention relates to the controlling of the operation of a plurality of electric motors and more specifically to controlling the operation of a plurality of electric motors used in association with a vehicle transmission.

A known shifting mechanism for use in association with a vehicle transmission is disclosed in U.S. Pat. No. 4,873,881 issued Oct. 17, 1989 and entitled "Electrically Actuated X-Y Shifting Mechanism". This shifting mechanism is easily connectable to and is compatible with shift bar housing assemblies of normally manually actuated mechanical transmissions without modification thereto. The shift mechanism provides for automatic or semi-automatic shifting of the otherwise substantially standard, normally manually shifted, transmission. This known shifting mechanism includes a rail select electric motor which is used to select a desired shift rail and an in-gear electric motor which is utilized to effect movement of the shift rail to engage or disengage a jaw clutch associated with the selected shift rail.

The electrical circuitry for controlling the operation of the rail select and the in-gear electric motors has previously included control circuitry having four switches for each electric motor. Two of the control switches associated with an electric motor are used to effect forward operation of the electric motor. The other two switches associated with the electric motor are used to effect reverse operation of the motor. Switches used to control the operation of either motor must be capable of conducting relatively large currents required to energize the motor. The cost of the motor control circuitry can be reduced by reducing the number of switches used to control the operation of the motors.

SUMMARY OF THE INVENTION

The present invention provides motor control circuitry for controlling the operation of a plurality of electric motors with a minimal number of switches. Although the motor control circuitry could be utilized in many different environments, it is preferred to use the motor control circuitry in association with a shift mechanism for a transmission. The shift mechanism may include a shift member which is movable to select one shift rail of a plurality of shift rails. The shift member is movable to move the selected one of the shift rails to effect shifting of gears in the transmission.

The shift mechanism includes a reversible rail select electric motor which moves the shift member between a plurality of positions in which the shift member is aligned with different shift rails. A reversible in-gear electric motor is provided to move the shift member and a shift rail with which it is aligned. Movement of the shift rail moves a clutch element relative to the gears. The motor control circuitry effects one-at-a-time operation of the rail select motor and the in-gear motor.

The motor control circuitry includes three groups of switches which are used to control the operation of the two electric motors. One of the switches in a center group of switches and one of the switches in the other two groups of switches is actuated to effect operation of one of the two motors. The number of switches required is two more than twice the number of electric motors.

In another embodiment of the invention, a clutch motor is provided to operate a main clutch between an engaged condition and a disengaged condition. The control circuitry for the clutch motor is combined with the control circuitry for the in-gear and rail select motors. By using the switches for controlling the operation of one of the other motors to also control the operation of the clutch motor, the number of switches required is minimized. The motor control circuitry includes pulse width modulation circuitry which effects simultaneous intermittent operation of the in-gear and clutch motors.

BRIEF DESCRIPTION OF THE DRAWINGS

The foregoing and other features of the invention will be more apparent upon a consideration of the following description taken in connection with the accompanying drawings, wherein.

DESCRIPTION OF SPECIFIC PREFERRED EMBODIMENTS OF THE INVENTION

Shift Mechanism

A known shift mechanism 10 (FIG. 1) provides for automatic and/or semi-automatic shifting of mechanical change gear transmissions normally utilized in trucks or similar vehicles. The transmission includes a plurality of parallel, spaced-apart, axially movable shift rails 12, 14, and 16. Downwardly extending (as viewed in FIG. 1) shift forks 18, 20 and 22 are connected with the shift rails 12, 14 and 16. Each of the shift forks 18, 20 and 22 engages a slidable clutch collar (not shown) of a well known nonsynchronized double-acting jaw-type clutch. As is well known, the shift forks 18, 20 and 22 are axially movable by the associated rails 12, 14 and 16 for selectively engaging/disengaging a first or a second gear to a shaft which is driven by a prime mover through the main clutch.

Figure 1:
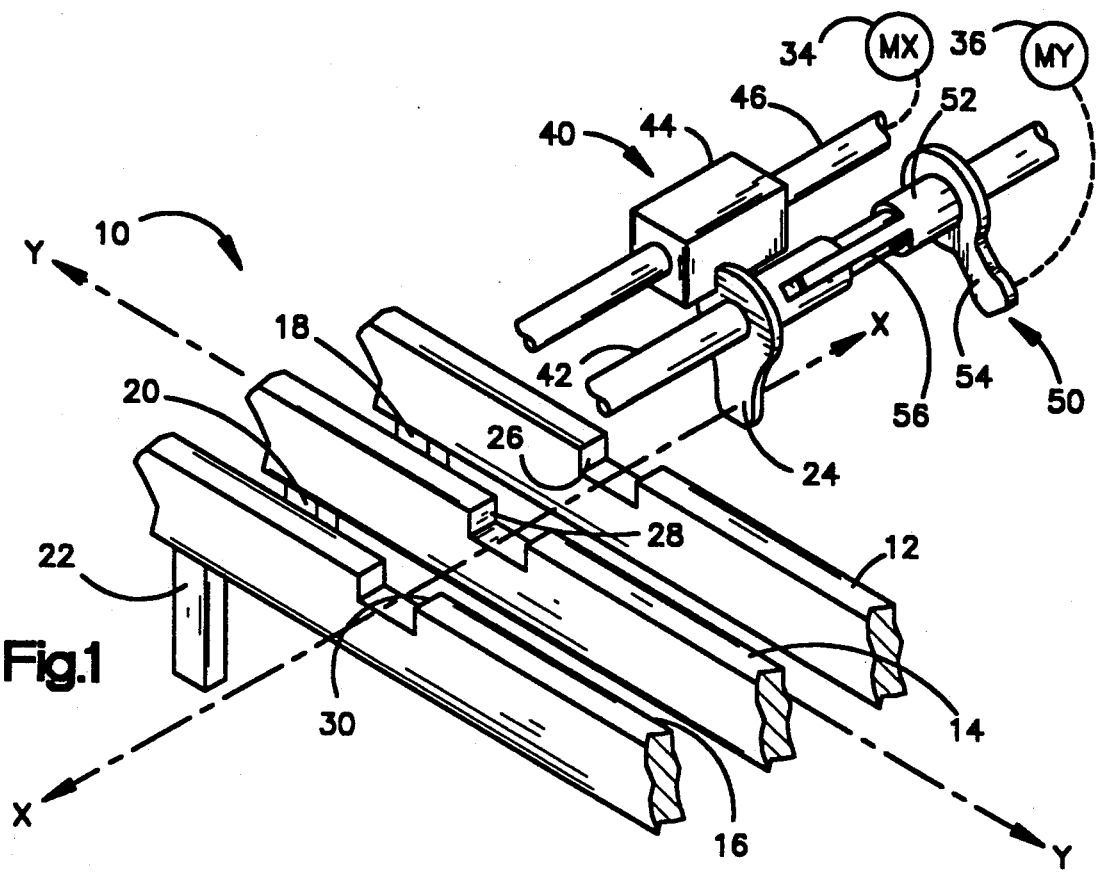
FIG. 1 is a schematic perspective view illustrating the relationship between a shifting mechanism and a plurality of shift rails in a transmission for a vehicle.

Typically, shifting of such transmissions is accomplished by selecting a shift rail by moving a shift finger 24 axially along an axis designated X—X in FIG. 1. As the shift finger 24 is moved along the X—X axis, it moves into alignment with a shift block or notch 26, 28 or 30 in each of the shift rails 12, 14 and 16 in turn. Once the shift finger 24 has been moved into alignment with the notch 26, 28 or 30 in the desired shift rail 12, 14 or 16, the shift finger 24 is pivoted to move the selected shift rail 12, 14 or 16 axially along an axis designated Y—Y in FIG. 1 and extending perpendicular to the X—X axis. As the selected rail 12, 14 or 16 is moved axially by pivotal movement of the shift finger 24, the shift fork 18, 20 or 22 connected with the rail moves a jaw clutch to either engage or disengage a gear in the transmission.

The shift mechanism 10 includes a first or rail select motor 34 which moves the shift finger 24 along the X—X axis. The motor 34 is a reversible electric motor which can be operated to move the shift finger 24 toward either the left or the right as viewed in FIG. 1. A second or in-gear motor 36 is operable to move the shift finger 24 along the Y—Y axis. The motor 36 is a reversible electric motor which can be operated to pivot the shift finger 24 in either a clockwise or a counterclockwise direction.

A rail select mechanism 40 moves the shift finger 24 along the X—X axis during operation of the rail select motor 34. Thus, the shift finger 24 is slidably supported on a support shaft 42 having a longitudinal axis which extends parallel to the X—X axis. An internally threaded traversing member 44 engages an arcuate upper (as viewed in FIG. 1) portion of the shift finger 24. An externally threaded drive shaft 46 engages the internally threaded traversing member 44.

Operation of the rail select motor 34 rotates the drive shaft 46 to move the traversing member 44 along the drive shaft 46. As the traversing member 44 is moved along the drive shaft 46, the traversing member moves the shift finger 24 in the same direction along the support shaft 42. When the shift finger 24 has moved into axial alignment with a selected shift rail 12, 14 or 16, operation of the rail select motor 34 is interrupted.

An in-gear mechanism 50 moves the shift finger 24 along the Y—Y axis. This results in movement of the shift rail 12, 14 or 16 with which the shift finger 24 is in alignment, along the Y—Y axis to move one of the jaw clutches to engage or disengage a gear in the transmission. The in-gear mechanism 50 includes a rotator 52 which is connected with the in-gear motor 36. The rotator 52 is fixedly connected (pinned) to the support shaft 42. The in-gear motor 36 is operable to pivot a lever arm 54 connected with the rotator 52. Pivotal movement of the lever arm 54 causes the rotator 52 to rotate about the support shaft 42.

Rotation of the rotator 52 about the support shaft 42 is transmitted to the shift finger 24 through an axially extendible and retractable coupling 56. Upon rotation of the rotator 52, the shift finger 24 is rotated in the same direction about the shaft 42. Rotation of the shift finger 24 moves the shift rail 12, 14 or 16 with which the shift finger is aligned, along the Y axis.

Although it is contemplated that the shift mechanism 10 could have many different constructions, in the illustrated embodiment of the invention, the shift mechanism 10 has the same construction as is disclosed in U.S. Pat. No. 4,873,881, issued Oct. 17, 1989 and entitled "Electrically Actuated X-Y Shifting Mechanism". The manner in which the shift mechanism 10 cooperates with the transmission and is utilized to control shifting of the transmission is similar to that disclosed in U.S. Pat. No. 5,063,511, issued Nov. 5, 1991 and entitled "Enhanced Missed Shift Recovery for Semi-Automatic Shift Implementation Control System".

Motor Control Circuitry

Improved motor control circuitry 60 (FIG. 2) effects operation of the rail select motor 34 and in-gear motor 36 one-at-a-time. In accordance with one of the features of the invention, the motor control circuitry 60 includes a number of switches which is only two more than twice the number of motors being controlled. Thus, the operation of the two reversible electric motors 34 and 36 is controlled by only six switches which conduct current to energize the motors.

The motor control circuitry 60 includes three groups of two switches each. Thus, there is a left (as viewed in FIG. 2) group 64 of switches, a center group 66 of switches and a right group 68 of switches. The center group 66 of switches is used with either the left group 64 or the right group 68 of switches to effect energization of either the rail select motor 34 or the in-gear motor 36 and to control the direction of operation of the selected motor.

The left group of switches 64 includes a pair of switches 72 and 74. The center group 66 of switches includes a pair 76 and 78 of switches. The right group 68 of switches includes a pair 80 and 82 of switches. In the illustrated embodiment of the invention, the switches 72, 74, 76, 78, 80 and 82 are all field-effect transistors. However, a different type of switching element could be utilized if desired.

Assuming the rail select motor 34 is to be operated, one switch in the left group 64 of switches and one switch in the center group 66 of switches is closed. The other switches remain open. Similarly, if the in-gear motor 36 is to be operated, one switch in the center group 66 of switches and one switch in the right group 68 of switches is closed. The other switches remain open.

The direction of operation of the selected motor 34 or 36 is determined by which two switches are closed to operate the motor. When the rail select motor 34 is to be operated in a forward direction, the switches 72 and 78 are closed to conduct the electrical energy for energizing the rail select motor. The switches 80 and 82 remain open so that the in-gear motor 36 is not operated. The switches 74 and 76 remain open to impress battery voltage across the rail motor 34. Operation of the rail select motor 34 in the forward direction causes the rail select mechanism 40 to move the shift finger 24 toward the left (as viewed in FIG. 1).

When the rail select motor 34 is to be operated in the reverse direction, the switches (FIG. 2) are closed to conduct the electrical energy for energizing the rail select motor. The switches 80 and 82 remain open so that the in-gear motor 36 is not operated. The switches 72 and 78 remain open to impress battery voltage across the rail motor 34. Operation of the rail select motor 34 in the reverse direction causes the rail select mechanism 40 to move the shift finger 24 towards the right (as viewed in FIG. 1).

When the in-gear motor 36 is to be operated in a forward direction, the switches 76 and 82 (FIG. 2) are closed to conduct the electrical energy for energizing the in-gear motor. The switches 72 and 74 remain open so that the rail select motor 34 is not operated. The switches 78 and 80 remain open to impress battery voltage across the in-gear motor 36. Operation of the in-gear motor 36 in a forward direction pivots the shift finger 24 in a clockwise direction (as viewed in FIG. 1). Clockwise pivoting movement of the shift finger 24 moves a shift rail 12, 14 or 16 with which the shift finger is aligned toward the left (as viewed in FIG. 1).

When the in-gear motor 36 is to be operated in the reverse direction, the switches 78 and 80 (FIG. 2) are closed to conduct the electrical energy for energizing the in-gear motor. The switches 72 and 74 remain open so that the rail select motor 34 is not operated. The switches 76 and 82 remain open to impress battery voltage across the in-gear motor 36. Operation of the in-gear motor 36 in the reverse direction pivots the shift finger 24 in a counterclockwise direction (as viewed in FIG. 1). Counterclockwise pivoting movement of the shift finger 24 moves the shift rail 12, 14 or 16 with which the shift finger is aligned towards the right (as viewed in FIG. 1).

The terms forward and reverse have been used herein as convenient terms to denote opposite directions of operation of one of the electric motors 34 or 36. The terms forward and reverse, as used herein in conjunction with the motors 34 and 36, do not relate to directions of movement of a vehicle in which the motors are mounted. It should also be understood that when the motors 34 and 36 are both operating in a forward or reverse direction, they could be rotating in opposite directions.

Control circuitry 86 (FIG. 2) effects actuation of the switches 72, 74, 76, 78, 80 and 82 in accordance with inputs from the driver of a vehicle during a shifting operation. Thus, the control circuitry 86 is connected with the switch 72 by a lead 88. The control circuitry 86 is connected with the switch 74 by a lead 90. The control circuitry 86 is connected with the switch 76 by a lead 92. The control circuitry 86 is connected with the switch 78 by a lead 94. The control circuitry 86 is connected with the switch 80 by a lead 96. The control circuitry is connected with the switch 82 by a lead 98.

As was previously explained, the switches 72, 74, 76, 78, 80 and 82 are field-effect transistors. When the switches are in a nonconducting condition, they are considered as being open. When the switches are in a conducting condition, they are considered as being closed. Of course, other known switching devices could be used in place of field-effect transistors if desired.

In the foregoing description of the operation of the motor control circuitry 60 and control circuitry 86, various combinations of the switches 72–82 have been described as being open to operate one of the motors 34 or 36 until the switch is closed. In actual practice, it has been found that the full torque and operating speed capabilities of the motors 34 and 36 are not required to operate the rail select mechanism 40 and in-gear mechanism 50. If the rail select motor 34 or the in-gear motor 36 is operated at full speed, difficulty may be encountered in accurately moving the shift finger 24 in the desired manner. Therefore, pulse width modulation is used to effect rapid changing of at least one of the switches between the open (nonconducting) and closed (conducting) conditions. This regulates the speed of operation of the associated motor.

Figure 3A:
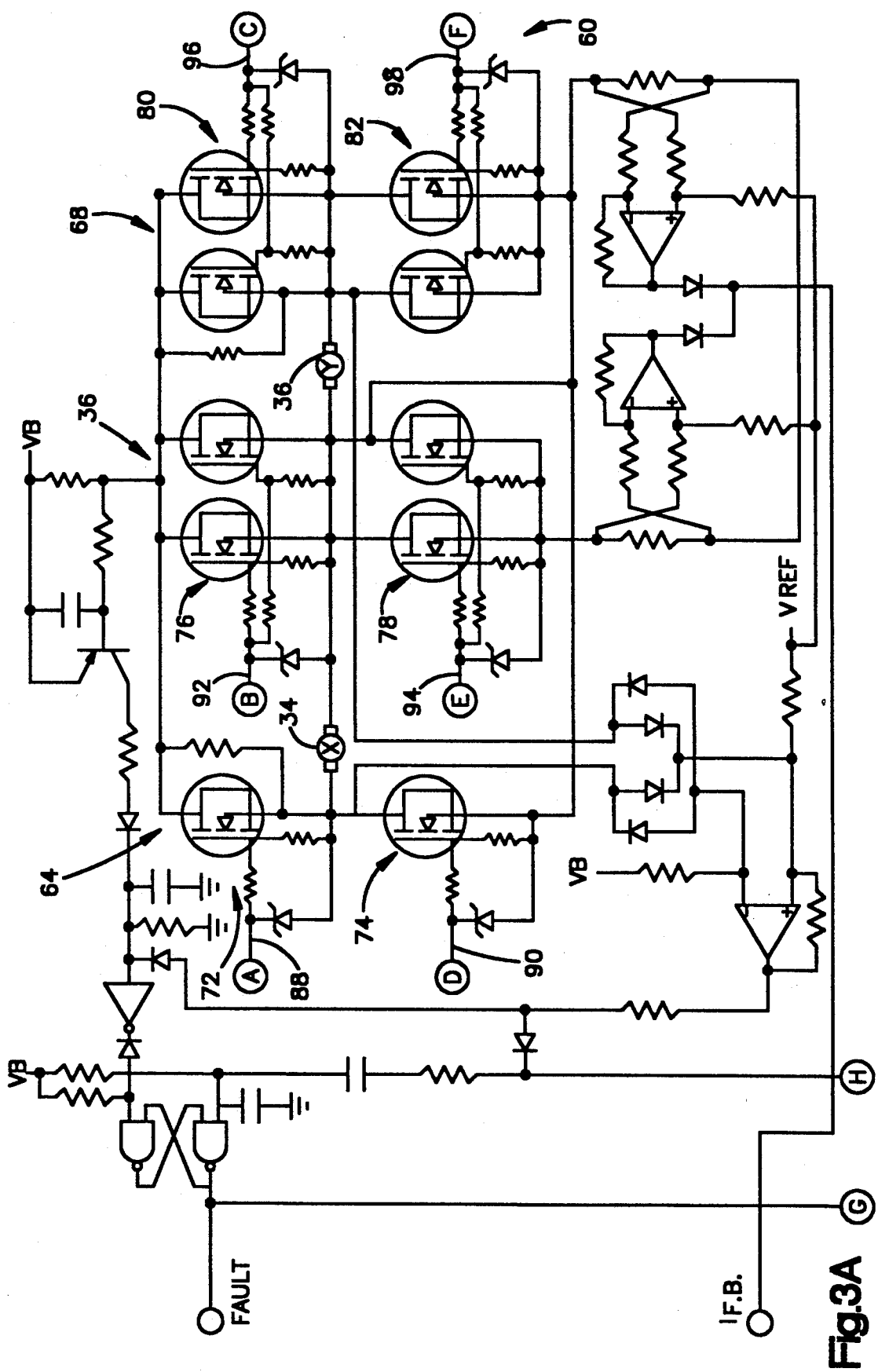
FIGS. 3A, 3B and 3C are schematic illustrations of one embodiment of the control circuitry of FIG. 2.
Figure 3B:
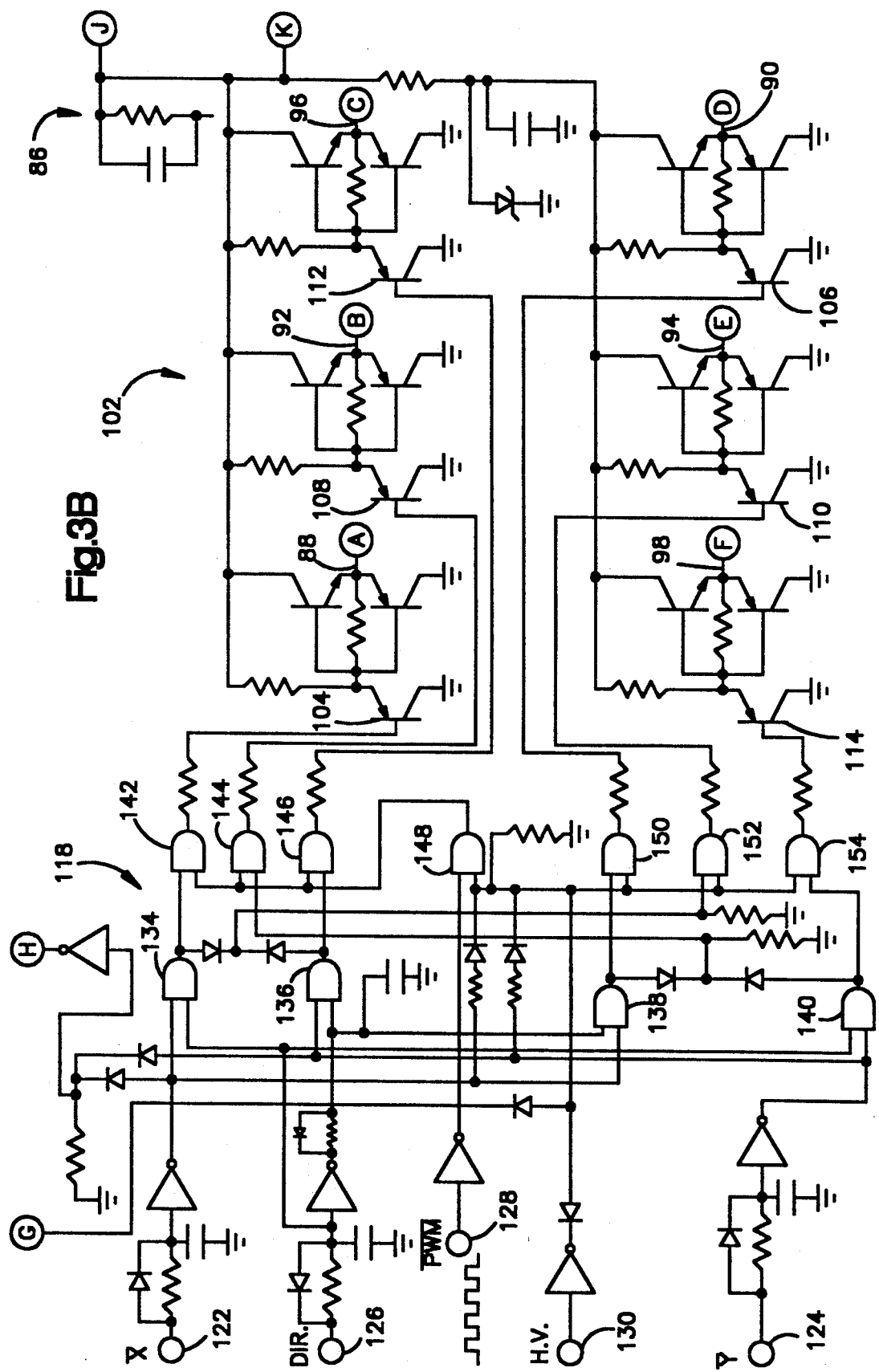
Figure 3C:
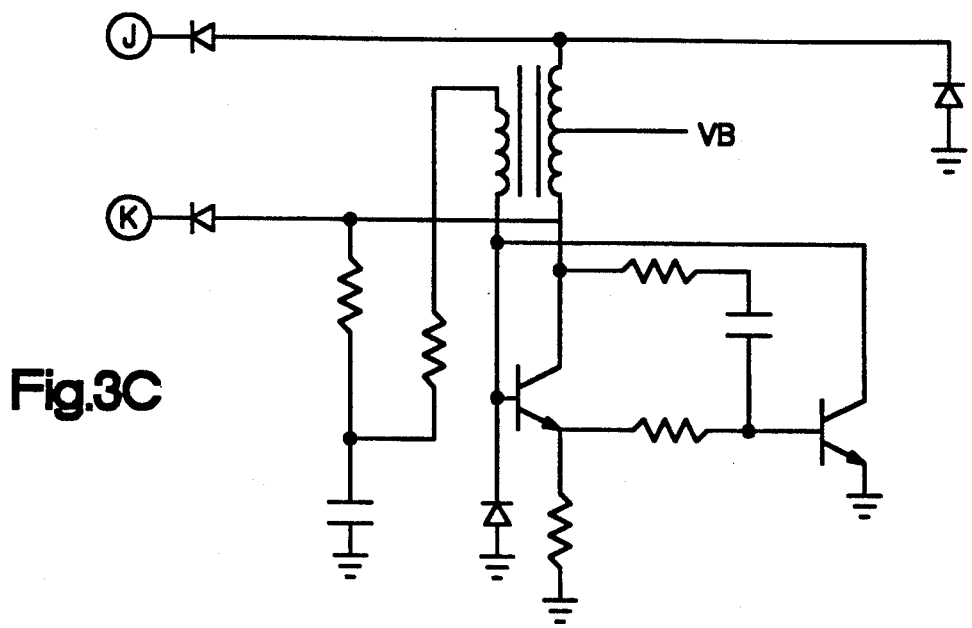

A schematic of one embodiment of the motor control circuitry 60 and switch control circuitry 86 is illustrated in FIGS. 3A, 3B and 3C. The circuitry of FIG. 3A is connected to the circuitry of FIG. 3B at terminals G and H. The circuitry of FIG. 3B is connected to the circuitry of FIG. 3C at terminals J and K.

In the motor control circuitry 60, the switches 76, 78, 80 and 82 (FIG. 3A) are each illustrated as being a pair of field-effect transistors connected in parallel. By using a pair of field-effect transistors in parallel, relatively large current loads for energizing the in-gear motor 36 can be accommodated by the switches 76, 78, 80 and 82. However, it is believed, that, for certain transmissions at least, it may not be necessary to connect a pair of field-effect transistors parallel to handle the current requirements of the in-gear motor 36. In these transmissions, only a single field-effect transistor would be used, as shown for the switches 72 and 74 in FIG. 3A.

As was previously explained, it is believed that pulse width modulation may be advantageously used in order to facilitate controlling the operation of the rail select motor 34 and in-gear motor 36. In the embodiment of the invention illustrated in FIG. 3A, pulse width modulation is used in conjunction with the switches 72, 76 and 80. Thus, rather than being opened or turned on and then being closed or turned off, the switches 72, 76 and 80 are rapidly pulsed when they are opened or turned on to control the rate of operation of the associated motor.

Thus, when the rail select motor 34 is to be operated in the forward direction, the switch 72 is rapidly pulsed between the conducting and nonconducting conditions while the switch 78 remains continuously conducting. Similarly, when the rail select motor 34 is to be operated in a reverse direction, the switch 76 is rapidly pulsed between the conducting and nonconducting conditions while the switch 74 remains continuously turned on or in a conducting condition. When the in-gear motor 36 is to be operated in a forward direction, the switch 76 is rapidly pulsed between the conducting and nonconducting conditions while the switch 82 remains continuously on or in the conducting condition. Similarly, when the in-gear motor 36 is to be operated in the reverse direction, the switch 80 is rapidly pulsed between the conducting and nonconducting conditions while the switch 78 remains continuously on or in the conducting condition.

The switch control circuitry 86 (FIG. 3B) includes control switches 102 which are connected with the main or motor control switches 72, 74, 76, 78, 80 and 82 by the leads 88–98. Thus, the control switches 102 include a control switch 104 which is connected with the main switch 72 by the lead 88. A control switch 106 is connected with the main switch 74 by the lead 90. A control switch 108 is connected with the main switch 76 by the lead 92. A control switch 110 is connected with the main switch 78 by a lead 94. A control switch 112 is connected with the main switch 80 by a lead 96. Finally, a control switch 114 is connected with the main switch 82 by the lead 98. The control switches 102 conduct substantially smaller currents than the main or motor control switches 72–82. Therefore, the control switches 102 are substantially less expensive than the main or motor control switches 72–82.

During operation of one of the motors 34 or 36, one of the control switches 88, 92 or 96 is pulsed to effect rapid operation of one of the switches 72, 76 or 80 between the conducting and nonconducting conditions. Although it is preferred to utilize pulse width modulation in order to control the operation of the motors 34 and 36, it should be understood that the switches 72, 76 and 80 could be continuously turned on if desired.

Logic circuitry 118 (FIG. 3B) is connected with the control switches 102 and effects operation of the control switches in accordance with input signals to the logic circuitry. Thus, when the rail select motor 34 is to be operated, a negative signal is provided at a terminal 122 ($\overline{X}$). At this time, a positive signal is provided at a terminal 124 ($\overline{Y}$). Similarly, if the in-gear motor 36 is to be operated, a negative signal is provided at the terminal 124 and positive signal is provided at the terminal 122. When the motor 34 or 36 is to be operated in a forward direction, a positive signal is provided at a terminal 126 (DIR). When one of the motors 34 or 36 is to be operated in the reverse direction, a negative signal is provided at terminal 126.

During operation of either the motor 34 or the motor 36, pulse width modulation is used to control the speed of operation of the motor. Therefore, the signal at the terminal 128 ($\overline{PWM}$) constantly changes between a positive and negative value at a rate which corresponds to the desired pulse width modulation rate. Thus, input to the terminal 128 is continuously pulsed between a positive input and a negative input with the duration of each negative pulse being a direct function of the speed at which the motor 34 or 36 is to be operated in the forward or reverse direction. The input to the terminal 128 remains negative for the increment of time during which a main switch 72, 76 or 80 is to remain conducting. The input to the terminal 128 remains positive for the increment of time during which a main switch 72, 76 or 80 is to remain nonconducting. It should be understood that the main switches 72, 76 and 80 are considered as being turned on or closed even though they are continuously pulsed between a conducting and nonconducting condition, A high voltage terminal 130 (H.V.) normally has a negative input. However, in the event of excessive voltage in the electrical circuitry of the vehicle, the input to the terminal 130 becomes positive. This results in the main motor control switches 72-82 being turned off, that is rendered nonconducting.

The logic circuitry 118 includes a plurality of AND gates 134, 136, 138, 140, 142, 144, 146, 148, 150, 152 and 154 (FIG. 3B). The AND gates 134-154 receive inputs from the terminals 122, 124, 126, 128 and 130 to control the operation of the switches 102. This results in the logic circuitry 118 controlling the operation of the main switches 72-82. The output from an AND gate is negative if there is no input to one of the terminals of the AND gate or if there is a negative input to one of the terminals of the AND gate.

The direction of operation of the rail select and in-gear motors 34 and 36 for various inputs at the terminals 122, 124 and 126 and the switches 72-82 which are closed, that is conducting, is set forth in Table I. The output for the AND gates 134-154 for forward and reverse operating conditions of the motors 34 and 36 is set forth in Table II.

TABLE I

| Motor and Direction of Operation | Input Terminal | | | Control Switch ON | Main Switch ON |
|---|---|---|---|---|---|
| | X 122 | DIR 126 | Y 124 | | |
| Rail select 34-FWD | − | + | + | 104, 110 | 72, 78 |
| Rail select 34-REV | − | − | + | 108, 106 | 76, 74 |
| In-gear 36-FWD | + | + | − | 108, 114 | 76, 82 |
| In-gear 36-REV | + | − | − | 112, 110 | 80, 78 |

TABLE II

| Motor and Direction of Operation | AND Gate Output | | | | | | | | | | |
|---|---|---|---|---|---|---|---|---|---|---|---|
| | 134 | 136 | 138 | 140 | 142 | 144 | 146 | 148 | 150 | 152 | 154 |
| Rail Select 34-FWD | + | − | − | − | + | − | − | + | − | + | − |
| Rail select 34-REV | − | − | + | − | − | + | − | + | + | − | − |
| In-gear 36-FWD | − | − | − | + | − | + | − | + | − | − | + |
| In-gear 36-REV | − | + | − | − | − | − | + | + | − | + | − |

Second Embodiment

Figure 2:
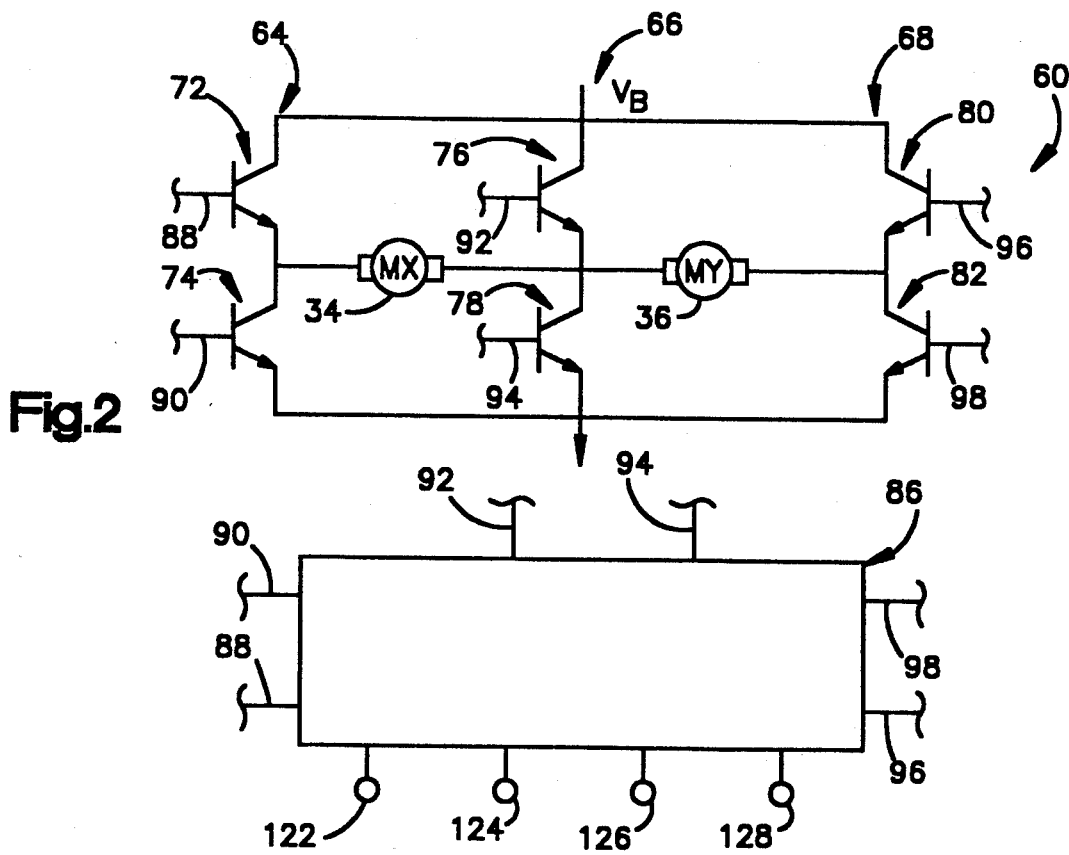
FIG. 2 is a highly schematicized illustration of control circuitry used in conjunction with reversible electric motors in the shift mechanism of FIG. 1.

In the embodiment of the invention illustrated in FIGS. 1-3, the operation of a main clutch which interconnects the transmission and a source of power is controlled separately by an apparatus which is not shown. In the embodiment of the invention illustrated in FIG. 4, the rail select motor, in-gear motor and a main clutch motor are all controlled by motor control circuitry 160. In the embodiment of the invention shown in FIG. 4, the rail select motor and the in-gear motor are operated one-at-a-time, the same as in the embodiment of the invention illustrated in FIGS. 1-3. However, the clutch motor and the in-gear motor can be simultaneously operated to effect operation of the main clutch during movement of a jaw clutch in the transmission. Since the motor control circuitry 160 and the switch control circuitry 162 utilized in the embodiment of the invention illustrated in FIG. 4 is generally similar to the motor control circuitry and switch control circuitry utilized in the embodiment of the invention illustrated in FIGS. 1-3, similar numerals will be utilized to designate similar components, the suffix letter "a" being associated with the numerals of FIG. 4 to avoid confusion.

Figure 4:
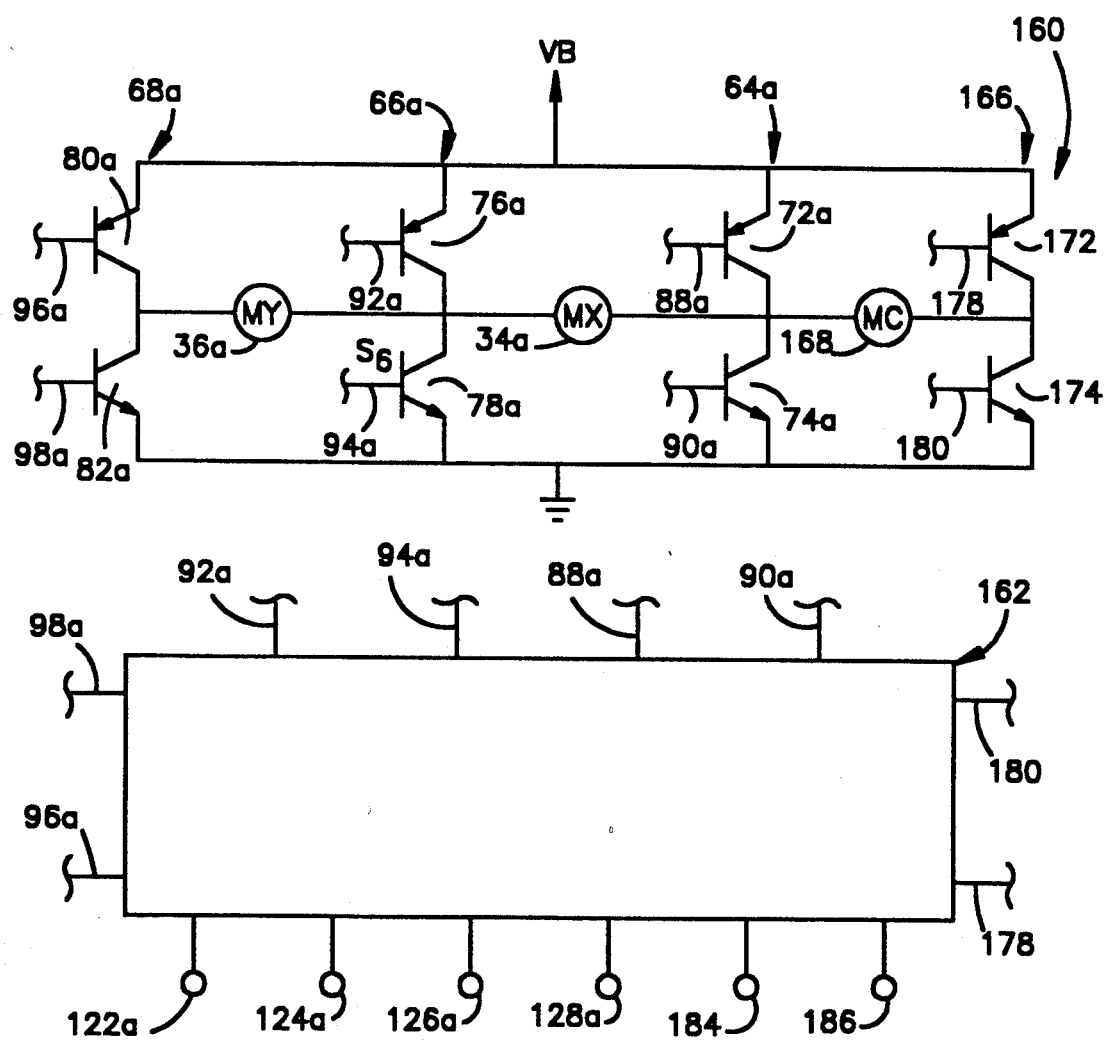
FIG. 4 is a highly schematicized illustration of control circuitry used in a second embodiment of the invention to control the operation of a plurality of reversible electric motors.

In the embodiment of the invention illustrated in FIG. 4, there are three groups of switches 64a, 66a and 68a to control the direction of operation of the rail select motor 34a and the in-gear motor 36a. In addition, there is a fourth group of switches 166 which cooperates with the first group of switches 64a to control the direction of operation of a main clutch motor 168. The fourth group of switches 166 includes a pair of main switches 172 and 174. The switches 172 and 174, like the switches 72a-82a are field-effect transistors. The field-effect transistors 172 and 174 are operable between an on or conducting condition, and an off or nonconducting condition.

When the rail select motor 34a is to be operated, one switch in the group 64a of switches and one switch in the group 66a of switches is closed. At this time, all of the other switches are in an open or nonconducting condition. Therefore, the in-gear motor 36a and main clutch motor 168 are not operated during operation of the rail select motor 34a in either the forward or the reverse direction.

When the in-gear motor 36a is to be operated, one switch in a group 66a of switches and one switch in a group 68a of switches is closed. If only the in-gear motor 36a is to be operated, all of the other switches are in an open condition. However, it may be desirable to operate the in-gear motor 36a and main clutch motor 168 at the same time.

When the main clutch motor 168 is to be operated, one switch in a group 64a of switches and one switch in a group 166 of switches is closed. If the in-gear motor 36a is not be operated with the main clutch motor 168, all of the other switches remain in an open or nonconducting condition.

When the main clutch motor 168 is to be operated in a forward direction, the switches 72a and 174 are closed. The switches 172 and 74a remain open. Operation of the main clutch motor 168 in the forward direction effects engagement of the main clutch.

When the main clutch motor 168 is to be operated in the reverse direction, the switches 172 and 74a are actuated to the closed or conducting condition and the switches 72a and 174 remain open or nonconducting. Operation of the main clutch motor in the reverse direction effects disengagement of the main clutch. The manner in which operation of the main clutch motor 168 effects engagement and disengagement of the main clutch is the same as is disclosed in U.S. Pat. No. 4,651,855, issued Mar. 24, 1987 and entitled "Automatic Clutch Control Device".

The switch control circuitry 162 effects operation of the main switches 72a-82a in the same manner as previously explained in conjunction with the embodiment of the invention illustrated in FIGS. 1-3. In addition, the switch control circuitry effects operation of the main switches 172 and 174 in a manner similar to the manner in which the main switches 72a-82a are operated. Thus, the main switches 172 and 174 are connected with the switch control circuitry 162 by leads 178 and 180. In addition to the terminals 122a, 124a, 126a and 128a which corresponds to the terminals 122, 124, 126 and 128 of FIG. 3B, the control circuitry 162 includes an input terminal 184 which receives an input signal indicating whether or not the clutch motor 168 is to be operated. A terminal 186 receives an input signal indicating whether the clutch motor 168 is to be operated in a forward direction or a reverse direction.

Although the rail select motor 34a is always operated by itself, it is contemplated that it may be desired to operate the main clutch motor 168 at the same time that the in-gear motor 36a is operated. However, it is important that the rail select motor 34a is not operated during operation of the clutch motor 168 and in-gear motor 36a.

During operation of the in-gear motor 36a in forward direction and the clutch motor 168 in the forward direction, the switches 76a and 82a are in a closed or conducting condition to effect energization of the in-gear motor. The switches 72a and 174 are also in a closed or conducting condition to effect energization of the main clutch motor 168. This results in the opposite sides of the rail select motor 34a being exposed to the main voltage without being connected through to ground. Therefore, the rail select motor 34a does not operate.

When the in-gear motor 36a is operated in a reverse direction and the clutch motor 168 is operated in a reverse direction, the switches 78a, 80a, 74a and 172 are closed. This results in opposite sides of the rail select motor 34a being connected with ground. Therefore, the rail select motor 34a does not operate.

If the main clutch motor 168 and the in-gear motor 36a are to be operated in different directions, and if the switches required to effect operation of the in-gear motor 36a and clutch motor 168 are merely closed, a circuit would be completed to effect operation of the rail select motor 34a. To prevent the rail select motor 34a from operating during simultaneous operation of the in-gear motor 36a and clutch motor 168 in the reverse directions, out-of-phase pulse width modulation is utilized to energize the in-gear motor 36a and clutch motor 168.

During simultaneous operation of the in-gear motor 36a and main clutch motor 168 in the different directions, the in-gear motor 36a is energized by a series of pulses which effect a rapid change in the condition of at least one of the switches associated with the in-gear motor between conducting and nonconducting conditions. The main clutch motor 168 is energized by pulses which are 180° out-of-phase with the pulses utilized to energize the in-gear motor 36a. Therefore, at least one of the switches which are closed to effect energization of the main clutch motor is rapidly changed between the conducting and nonconducting condition by a series of pulses.

Since the series of pulses used to energize the main clutch motor 168 are 180° out-of-phase with the series of pulses used to energize the in-gear motor 36a, at least one of the switches which are closed to energize the main clutch motor 168 are in a conducting condition. Similarly, at least one of the switches which are closed to effect energization of the in-gear motor 36a are in a conducting condition when the switches which are closed to effect energization of the main clutch motor 168 are in a nonconducting condition.

For example, when the in-gear motor 36a is to be operated in a reverse direction, the switches 80a and 78a are closed. When the main clutch motor 168 is to be operated in a forward direction, the switches 72a and 174 are closed. Simultaneous closing of all four of these switches 80a, 78a, 72a and 174 provides a circuit through the switches 72a and 78a to energize the rail select motor 34a in the forward direction.

The switches 78a and 80a are pulsed between the conducting and nonconducting conditions to effect intermittent energization of the in-gear motor 36a in a reverse direction. To prevent the completion of a circuit through which the rail select motor 34a could be energized, the pulses for closing the switches 80a and 78a to energize the in-gear motor 36a are 180° out-of-phase with the pulses for closing the switches 72a and 174 to effect intermittent energization of the main clutch motor 168 in a forward direction.

To provide the out-of-phase relationship for the pulses for energizing the in-gear motor 36a and clutch motor 168, a series of pulses applied to the terminal 128a are conducted through logic control circuitry, corresponding to the logic control circuitry 118 of FIG. 3B along two different paths. One of the paths extends through an inverter while the other path does not extend through an inverter. This results in the pulses in the two paths being 180° out-of-phase with each other. The pulses which move along one of the paths, for example, the path which extends through the inverter, are utilized to effect operation of the switches 78a and 80a to a closed condition while the pulses which move along the other path, that is the path which does not have an inverter, are utilized to effect operation of the switches 72a and 174 to the closed condition.

Conclusion

The present invention provides motor control circuitry 60 or 160 which effects operation of a plurality of electric motors 34 and 36 or 34a, 36a and 168, with a minimal number of switch elements. Although the motor control circuitry 60 or 160 could be utilized in many different environments, it is preferred to use the motor control circuitry in association with a shift mechanism 10 for a transmission. The shift mechanism 10 may include a shift member 24 which is movable to select one shift rail of a plurality of shift rails 12, 14 and 16. The shift member 24 is movable to move the selected one of the shift rails to effect a shifting of gears in the transmission.

The shift mechanism 10 includes a reversible rail select electric motor 34 which moves the shift member 24 between a plurality of positions in which the shift member is aligned with different shift rails 12, 14 or 16.

A reversible in-gear electric motor 36 is provided to move the shift member 24 and a shift rail 12, 14, or 16 with which it is aligned. Movement of the shift rail 12, 14 or 16 moves a clutch element relative to the gears. The motor control circuitry 60 effects one-at-a-time operation of the rail select motor 34 and the in-gear motor 36.

The motor control circuitry includes three groups 64, 66 and 68 of switches 72, 74, 76, 78, 80 and 82 which are used to control the operation of the two electric motors 34 and 36. One of the switches 76 or 78 in a center of group 66 of switches and one of the switches in the other two groups 64 and 68 of switches is actuated to effect operation of one of the two motors. The number of switches 72, 74, 76, 78, 80 and 82 required is two more than twice the number of electric motors 34 and 36.

In another embodiment of the invention, a clutch motor 168 is provided to operate a main clutch between an engaged condition and a disengaged condition. The control circuitry (FIG. 4) for the clutch motor 168 is combined with the control circuitry for the in-gear and rail select motors 34a and 36a. By using the switches for controlling the operation of one of the other motors 34a or 36a to also control the operation of the clutch motor 168, the number of switches required is minimized. The motor control circuitry 160 and 162 includes pulse width modulation circuitry which effects simultaneous intermittent operation of the in-gear and clutch motors 36a and 168.

Having described the invention, the following is claimed:

1. An electrically actuated shifting mechanism for controlling the shifting of gear in a transmission of the type having a shift member which is movable to select one shift rail of a plurality of shift rails and is movable to move the selected one of the shift rails to effect a shifting of gears, said mechanism comprising first reversible electric motor means for moving the shift member between a plurality of positions in each of which the shift member is aligned with a different shift rail of the plurality of shift rails, second reversible electric motor means for moving the shift member and a shift rail with which the shift member is aligned in either one of two directions to move a clutch element relative to the gears, and motor control means for effecting one-at-a-time operation of said first and second electric motor means, said motor control means including a plurality of switch elements each of which is operable between conducting and nonconducting conditions, said plurality of groups, a first one of said switch elements in a first group of switch elements and a first one of said switch elements in a second group of switch elements being operable to conduct electrical energy for energizing said first electric motor means to operates in a first direction to move the shift member in one direction relative to the plurality of shift rails with said second electric motor means de-energized, a second one of said switch elements in said first group of switch elements and a second of said switch elements in said second group of switch elements being operable to conduct electrical energy for energizing said first electric motor means to operate in a second direction opposite to said first direction to move the shift member in a direction opposite to the one direction relative to the plurality of shift rails with said second electric motor means de-energized, said first one of said switch elements in said second group of switch elements and a first one of said switch elements in a third group of switch elements being operable to conduct electrical energy for energizing said second electric motor means to operate in a first direction to move the shift member and a shift rail in one direction with said first electric motor means de-energized, said second one of said switch elements in said second group of switch elements and a second one of said switch elements in said third group of switch elements being operable to conduct electrical energy for energizing said second electric motor means to operate in a second direction opposite to said first direction to move the shift member and a shift rail in a direction opposite to the direction of movement of the shift member and shift rail with said first electric motor means de-energized.

2. An electrically actuated shifting mechanism as set forth in claim 1 wherein a main clutch is operable to connect and disconnect a prime mover from the gears, said mechanism including third reversible electric motor means for effecting operation of the main clutch, said motor control means being operable to effect operation of said third motor means when said first motor means is de-energized, said first one of said switch elements in said first group of switch elements and a first one of said switch elements in a fourth group of switch elements being operable to conduct electrical energy for energizing said third electric motor means to operate in a first direction with said first electric motor means de-energized, said second one of said switch elements in said first group of switch elements and a second one of said switch elements in said fourth group of switch elements being operable to conduct electrical energy for energizing said third electric motor means to operate in a second direction opposite to said first direction with said first electric motor means de-energized.

3. An electrically actuated shifting mechanism as set forth in claim 1 wherein said first one of said switch elements in said third group of switch elements and said second one of said switch elements in said third group of switch elements are in the nonconducting condition when any one of said switch elements in said first group of switch elements is in the conducting condition.

4. An electrically actuated shifting mechanism as set forth in claim 3 wherein said first one of said switch elements in said first group of switch elements and said second one of said switch elements in said first group of switch elements are in the nonconducting condition when any one of said switch elements in said third group of switch elements is in the conducting condition.

5. An electrically actuated shifting mechanism as set forth in claim 1 further including pulse width modulation means for effecting rapid operation of at least one of said switch elements between the conducting and nonconducting conditions to modulate a flow of current to at least one of said electric motor means during operation of the one electric motor means.

6. An electrically actuated shifting mechanism for controlling the operation of a main clutch and the shifting of gears in a transmission connected with a source of power through the main clutch, the transmission being of the type having a shift member which is movable to select one shift rail of a plurality of shift rails and is movable to move the selected one of the shift rails to effect a shifting of gears, said mechanism comprising first electric motor means for moving the shift member between a plurality of positions in each of which the shift member is aligned with a different shift rail of the plurality of shift rails, second electric motor means for moving the shift member and a shift rail with which the shift member is aligned to move a clutch element relative to the gears, third electric motor means for effecting operation of the main clutch between an engaged condition and a disengaged condition, and motor control means for effecting operation of said first, second and third electric motor means, said motor control means including a plurality of switch elements each of which is operable between conducting and nonconducting conditions, said plurality of switch elements being interconnected in a plurality of groups, one of said switch elements in a first group of switch elements and one of said switch elements in a second group of switch elements being operable to conduct electrical energy for energizing said first electric motor means to move the shift member relative to the plurality of shift rails, one of said switch elements in said second group of switch elements and one of said switch elements in a third group of switch elements being operable to conduct electrical energy for energizing said second electric motor means to move the shift member and the shift rail, one of said switch elements in said first group of switch elements and one of said switch elements in a fourth group of switch elements being operable to conduct electrical energy for energizing said third electric motor means to operate the main clutch.

7. An electrically actuated shifting mechanism as set forth in claim 6 wherein said motor control means further includes pulse width modulation means for effecting rapid pulsing operation between the conducting and nonconducting conditions of at least one of the switch elements which are operable to conduct electrical energy for energizing said second electric motor means during operation of said second electric motor means, said pulse width modulation means effecting rapid pulsing operation between the conducting and nonconducting conditions of at least one of the switch elements which are operable to conduct electrical energy for energizing said third electric motor means during operation of said third electric motor means, said pulse width modulation means being operable to effect out-of-phase pulsing operation of said one switch element of the switch elements which are operable to conduct electrical energy for energizing said second electric motor means with said one switch element of the switch elements which are operable to conduct electrical energy for energizing said third electric motor means during simultaneous operation of said second and third electric motor means.

8. An electrically actuatable shifting mechanism as set forth in claim 7 wherein one of the switch elements of the switch elements which are operable to conduct electrical energy for energizing said second electric motor means and one of the switch elements of the switch elements which are operable to conduct electrical energy for energizing said third electric motor means are continuously maintained in the conducting condition and one of the switch elements which are operable to conduct electrical energy for energizing said second electric motor means and one of the switch elements which are operable to conduct electrical energy for energizing said third electric motor means are continuously pulsed between the conducting and nonconducting conditions during simultaneous operation of said second and third electric motor means.

* * * * *

UNITED STATES PATENT AND TRADEMARK OFFICE
CERTIFICATE OF CORRECTION

PATENT NO. : 5,315,218

DATED : May 24, 1994

INVENTOR(S) : Glenn C. Fortune and William L. Kelledes

It is certified that error appears in the above-identified patent and that said Letters Patent is hereby corrected as shown below:

Column 11, line 34, change "gear" to --gears--.

Column 11, line 50, after "said" insert --plurality of switch elements being interconnected in a--.

Column 11, line 55, change "operates" to --operate--.

Signed and Sealed this

Fourth Day of October, 1994

*Attest:*

BRUCE LEHMAN

*Attesting Officer*   *Commissioner of Patents and Trademarks*